US012590649B2

(12) United States Patent
Roa-Quispe et al.

(10) Patent No.: US 12,590,649 B2
(45) Date of Patent: *Mar. 31, 2026

(54) STRAIN RELIEF ASSEMBLY

(71) Applicant: Belden Canada ULC, Saint-Laurent (CA)

(72) Inventors: Christian Roa-Quispe, Laval (CA); Oscar Alberto Lazarte Barrios, Saint-Laurent (CA)

(73) Assignee: BELDEN CANADA ULC, Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,372

(22) Filed: Nov. 27, 2023

(65) Prior Publication Data

US 2024/0084925 A1     Mar. 14, 2024

Related U.S. Application Data

(63) Continuation of application No. 17/650,829, filed on Feb. 11, 2022, now Pat. No. 11,835,163.

(60) Provisional application No. 63/200,081, filed on Feb. 12, 2021.

(51) Int. Cl.
  *F16L 3/01*          (2006.01)
(52) U.S. Cl.
  CPC ..................................... *F16L 3/01* (2013.01)
(58) Field of Classification Search
  CPC ........... F16L 3/01; H02G 3/0437; H02G 3/32; H02G 3/263
  USPC .................................................. 248/65, 68.1
  See application file for complete search history.

(56) References Cited

U.S. PATENT DOCUMENTS

| | | | | |
|---|---|---|---|---|
| 3,991,960 | A | * | 11/1976 | Tanaka ..................... H02G 3/32 |
| | | | | 248/68.1 |
| 5,765,786 | A | * | 6/1998 | Gretz ....................... H02G 3/26 |
| | | | | 248/68.1 |
| 6,170,784 | B1 | * | 1/2001 | MacDonald ......... H05K 7/1448 |
| | | | | 248/65 |
| 6,629,675 | B1 | | 10/2003 | Bjorklund et al. |

(Continued)

FOREIGN PATENT DOCUMENTS

| | | |
|---|---|---|
| DE | 3018119 A1 | 11/1981 |
| DE | 102008057473 A1 | 5/2010 |

(Continued)

*Primary Examiner* — Muhammad Ijaz
(74) *Attorney, Agent, or Firm* — MH2 Technology Law Group, LLP

(57) ABSTRACT

A strain relief assembly comprising a support portion including a base portion, a first portion coupled with the base portion, and a second portion extending away from an end of the first portion, a strain relief portion attached to a free end of the second portion for rotation about an axis, a securing portion that moves relative to the strain relief portion between a secured position and a released position. The strain relief portion comprises a cable receiving portion arranged along the axis. The securing portion disables rotation of the strain relief member about the axis when in the secured position and enables rotation of the strain relief member about the axis when in the released position. The strain relief portion rotates about the axis between a first angled orientation and a second angled orientation through a horizontal orientation so as to enhance management of fiber optic-cables in high-density applications.

19 Claims, 5 Drawing Sheets

(56)  References Cited

U.S. PATENT DOCUMENTS

| | | | | |
|---|---|---|---|---|
| 6,702,237 B2* | 3/2004 | Rubenstein | ............. | H02G 3/30 |
| | | | | 248/65 |
| 7,027,706 B2* | 4/2006 | Diaz | ................. | G02B 6/44526 |
| | | | | 385/135 |
| 7,200,316 B2* | 4/2007 | Giraud | ................. | G02B 6/4455 |
| | | | | 385/134 |
| 7,345,241 B2 | 3/2008 | Caveney et al. | | |
| 7,734,139 B2 | 6/2010 | Rector, III | | |
| 8,464,984 B2 | 6/2013 | Laursen | | |
| 10,727,624 B2 | 7/2020 | Stellmacher et al. | | |
| 11,005,250 B2* | 5/2021 | Ciesielczyk | .............. | F16B 2/12 |
| 11,370,636 B2* | 6/2022 | Fontaine | ........... | B65H 75/2416 |
| 2004/0038588 A1 | 2/2004 | Bernardi et al. | | |
| 2007/0040355 A1* | 2/2007 | Spratte | ................. | B60G 17/015 |
| | | | | 280/511 |
| 2011/0315442 A1 | 12/2011 | Nolting et al. | | |
| 2014/0367529 A1* | 12/2014 | Choi | ........................ | F16L 3/01 |
| | | | | 248/68.1 |
| 2016/0245428 A1* | 8/2016 | Gustin | .................. | F16L 3/2431 |
| 2017/0002958 A1* | 1/2017 | Harnetiaux | ......... | B60R 16/0215 |
| 2018/0031794 A1* | 2/2018 | Sakmar | ................... | H02G 1/04 |
| 2019/0356088 A1* | 11/2019 | Stellmacher | ......... | H02G 15/007 |
| 2020/0028343 A1* | 1/2020 | Ciesielczyk | .............. | F16L 3/12 |
| 2020/0403390 A1* | 12/2020 | Jette | ...................... | H02S 40/30 |
| 2021/0285571 A1* | 9/2021 | Taillon | ..................... | F16L 3/16 |
| 2022/0260182 A1* | 8/2022 | Roa-Quispe | ............. | F16L 3/01 |

FOREIGN PATENT DOCUMENTS

| | | | |
|---|---|---|---|
| FR | 2524217 A1 | 9/1983 | |
| GB | 2091498 A | 7/1982 | |
| WO | 2018047099 A1 | 3/2018 | |

* cited by examiner

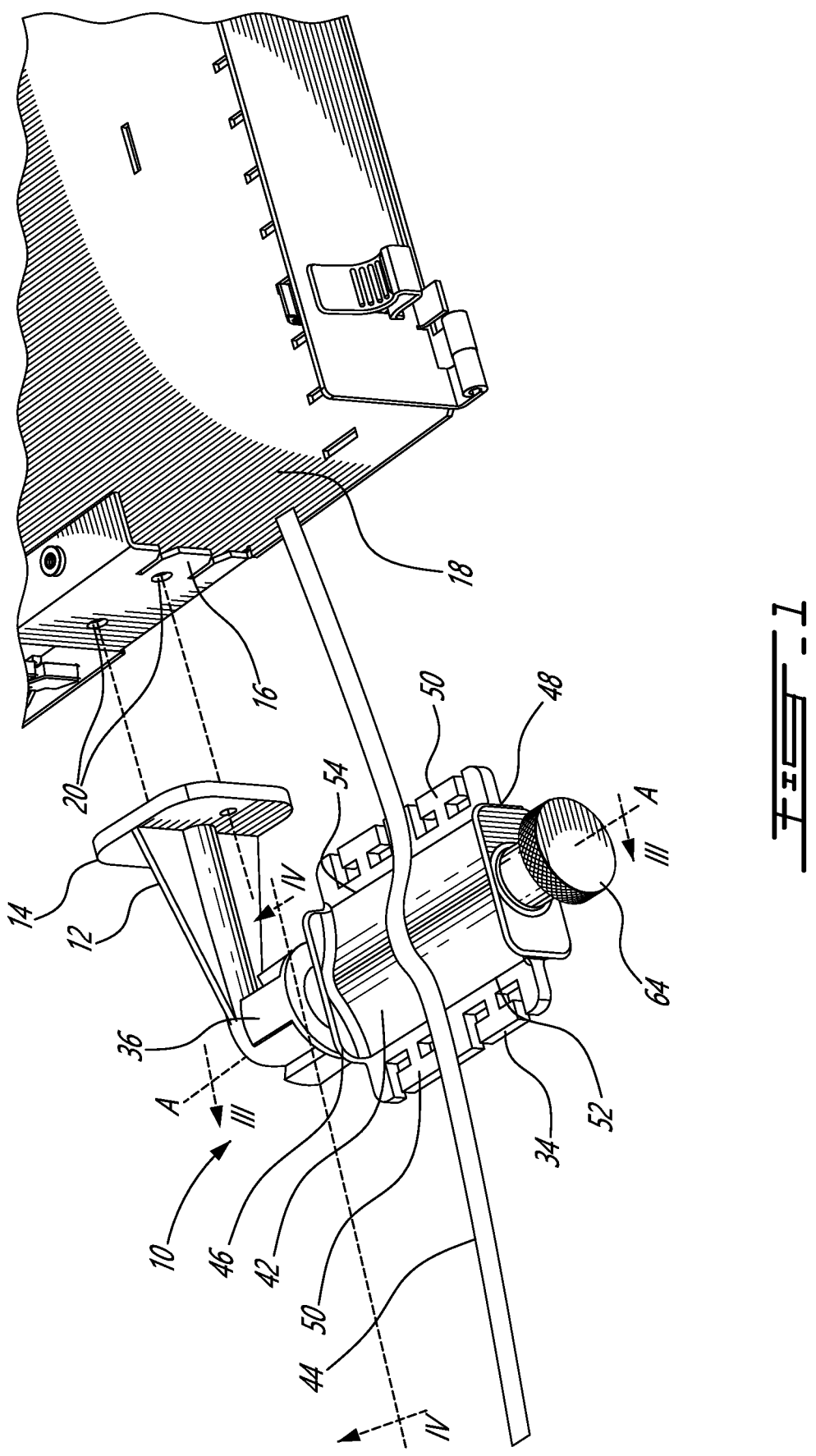
_FIG. - 1_

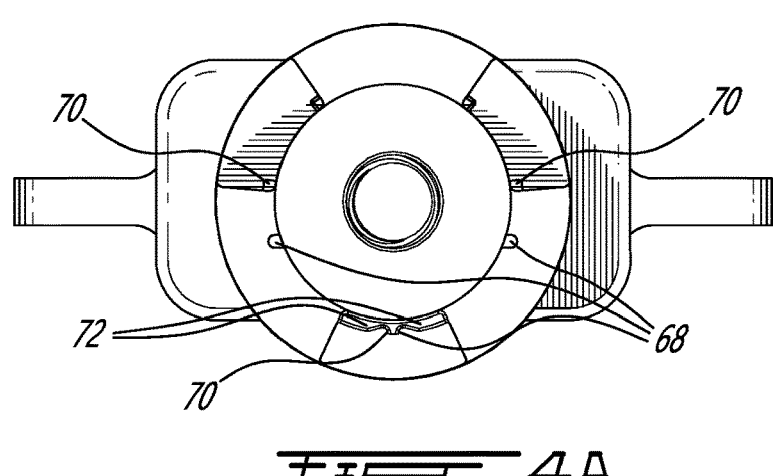
_FIG_4A
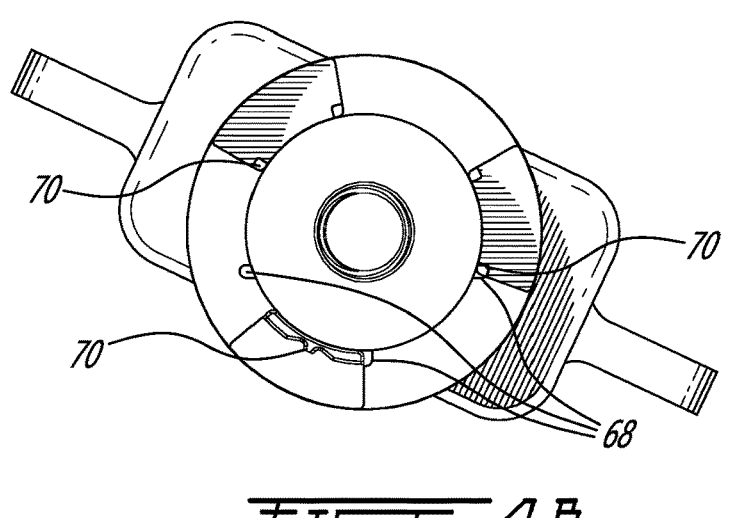
_FIG_4B
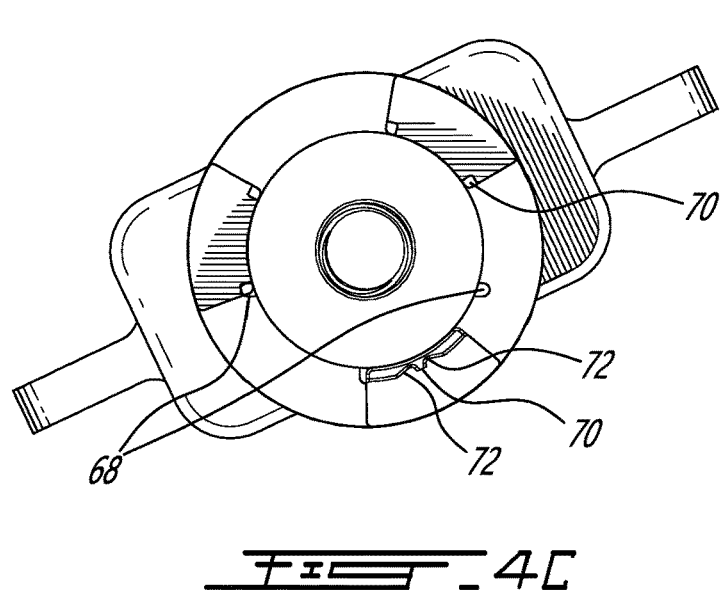
_FIG_4C

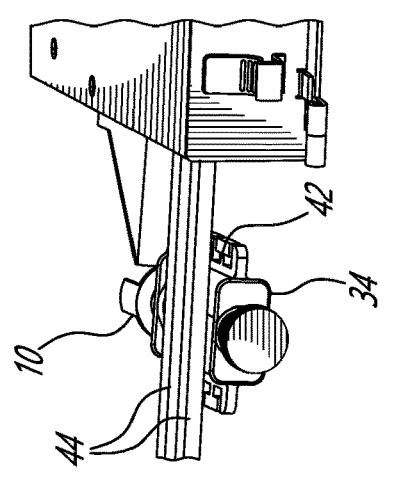
_Fig. 5C_
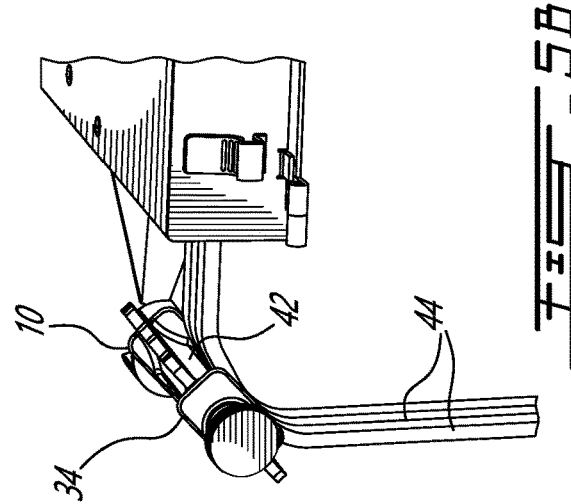
_Fig. 5B_
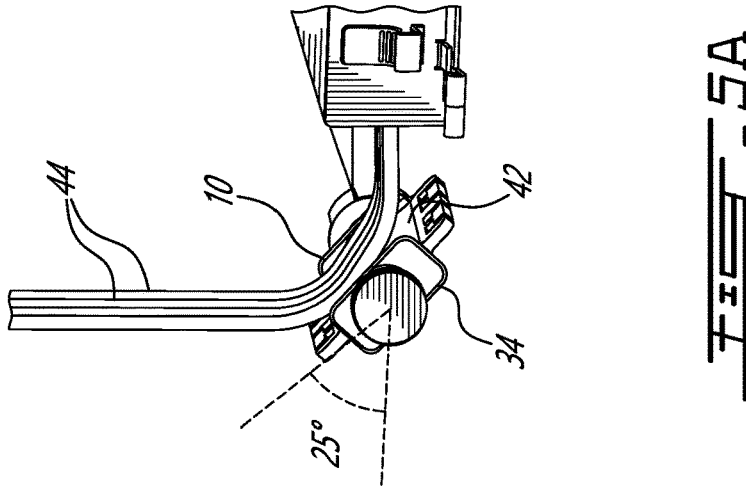
_Fig. 5A_

STRAIN RELIEF ASSEMBLY

CROSS REFERENCE TO RELATED APPLICATIONS

This application is a continuation of U.S. application Ser. No. 17/650,829 filed on Feb. 11, 2022 which claims benefit under 35 U.S.C. § 119(e) of U.S. provisional application Ser. No. 63/200,081 filed on Feb. 12, 2021. Both these documents are incorporated herein in their entirety by reference.

FIELD OF THE INVENTION

The present invention relates to a strain relief assembly. In particular, the present invention relates to an adjustable strain relief assembly mountable to a tray.

SUMMARY OF THE INVENTION

There is provided a strain relief assembly, comprising a support portion structurally configured to include a base portion, a first portion coupled with the base portion, and a second portion extending away from an end of the first portion, a strain relief portion structurally configured to attach to a free end of the second portion for rotation about an axis, a securing portion structurally configured to move relative to the strain relief portion between a secured position and a released position, wherein the strain relief portion comprises a cable receiving portion arranged along the axis. The securing portion is structurally configured to disable rotation of the strain relief member about the axis in the secured position. The securing portion is structurally configured to enable rotation of the strain relief member about the axis in the released position. The strain relief portion is structurally configured to rotate about the axis between a first angled orientation and a second angled orientation through a horizontal orientation so as to enhance management of fiber optic-cables in high-density applications.

There is also provided a strain relief assembly, comprising a support member, a strain relief member, a securing mechanism. The strain relief member is attached to a free end of the support member for rotation about an axis. The strain relief member comprises a cable receiving portion arranged along the axis and a cable receiving surface. The securing mechanism is configured to move between a secured position and a released position. In the secured position rotation of the strain relief member about the axis is disabled.

Furthermore, there is provided a device for preventing a strain relief member from rotating during operation comprising a strain relief member that is configured to rotate about an axis, the strain relief member comprising a cable receiving portion that extends along the axis, and a strain relief securing portion that is configured to prevent rotation of the strain relief member about the axis during operation of the strain relief member.

BRIEF DESCRIPTION OF THE DRAWINGS

FIG. 1 provides a raised perspective view of a strain relief assembly and tray in accordance with an illustrative embodiment of the present invention;

FIGS. 4A through 4C provide sectional views along IV-IV in FIG. 1; and

FIGS. 5A through 5C provide front perspective views of a strain relief assembly and tray receiving cables from different orientations and in accordance with an illustrative embodiment of the present invention.

DETAILED DESCRIPTION OF THE ILLUSTRATIVE EMBODIMENTS

Figure 2:
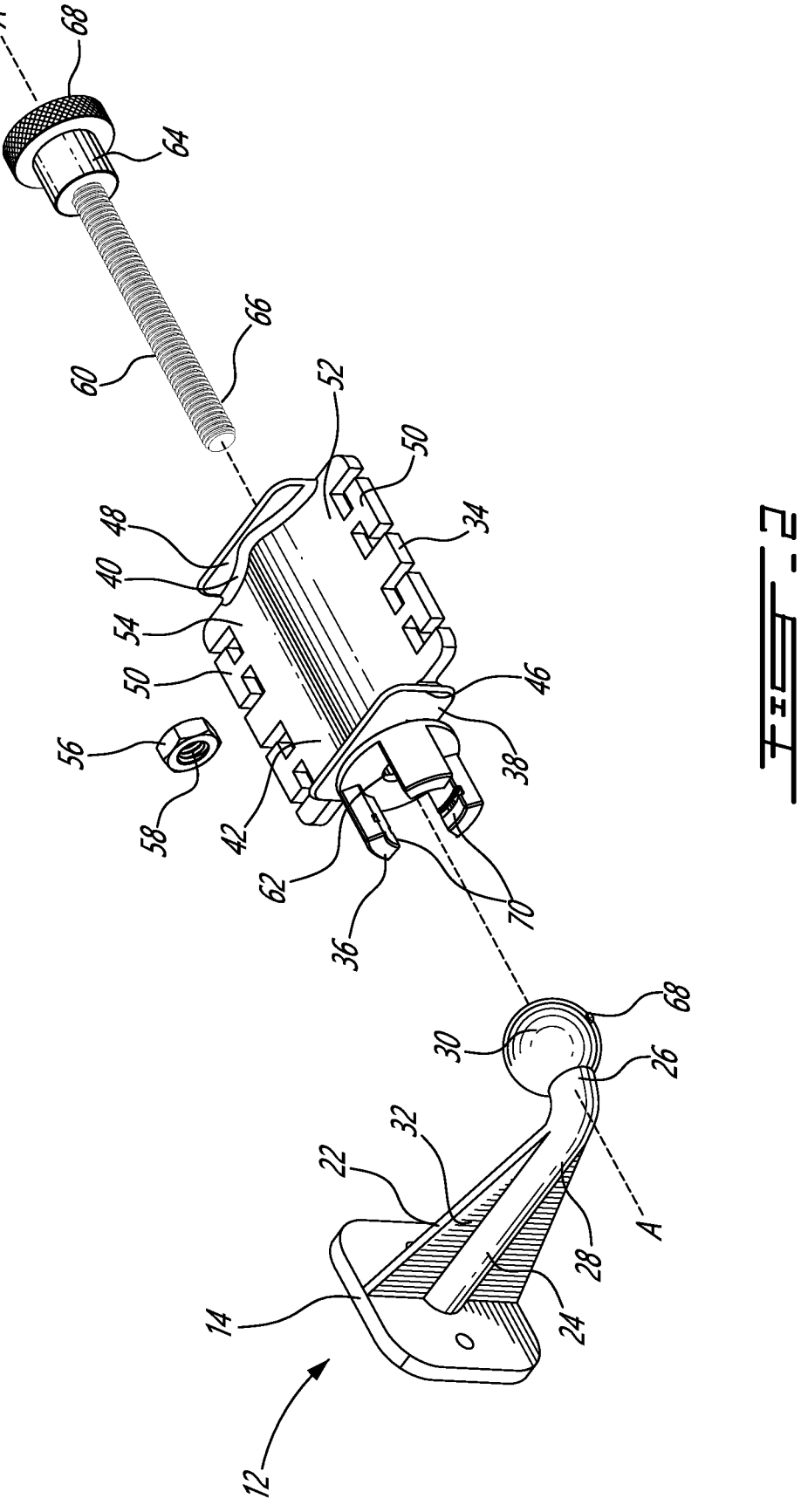
FIG. 2 provides a raised exploded perspective view of strain relief assembly in accordance with an illustrative embodiment of the present invention.

Referring now to FIG. 1, a strain relief assembly, generally referred to using the reference numeral 10, will now be described. The assembly 10 comprise a support 12 comprising a flat base 14 configured for attachment to a flat surface, such as the side 16 of a tray 18 or the like. In this regard, the flat base 14 can be secured to the side 16 using bolts or the like (not shown) which are engaged in complementary threaded bores 20 machined or otherwise formed in the side 16.

With reference now to FIG. 2 in addition to FIG. 1, the support 12 further comprises an elongate support member 22 comprising a rod-like first portion 24 attached to the base 14 and extending away therefrom in a direction which is substantially normal to the base 14 and a second portion 26 arranged at a right angle to the first portion 24 and interconnecting an outer end 28 of the first portion with a spherical ball 30. In a particular embodiment the second portion 26 is curved about 90 degrees between the outer end 28 and the ball 30. Re-enforcing abutments 32 are provided to stabilise the support member 22.

Still referring to FIG. 2 in addition to FIG. 1, the strain relief assembly 10 further comprises an elongate strain relief member 34 comprising a socket 36 at a first end 38 and configured for receiving the ball 30 in a ball and socket relationship and for limited rotation about an axis A-A. The strain relief member 34 further comprises an elongate cable receiving part 40 arranged along the axis A-A. The cable receiving part 40 further comprises a pair of cable receiving surfaces 42 of like shape and opposite one another on either side of the axis A-A for receiving cables 44 thereon. In order to retain the cables 44 on the surfaces 42 first and second collars 46, 48 are provided at respective ends of the cable receiving part 40. Similarly, cable securing features 50 are provided along a length of the outer long edges 52, 54 of the cable receiving part 40. In this regard the cable securing features 50 provide convenient locations for securing cable ties or the like (not shown).

Figure 3:
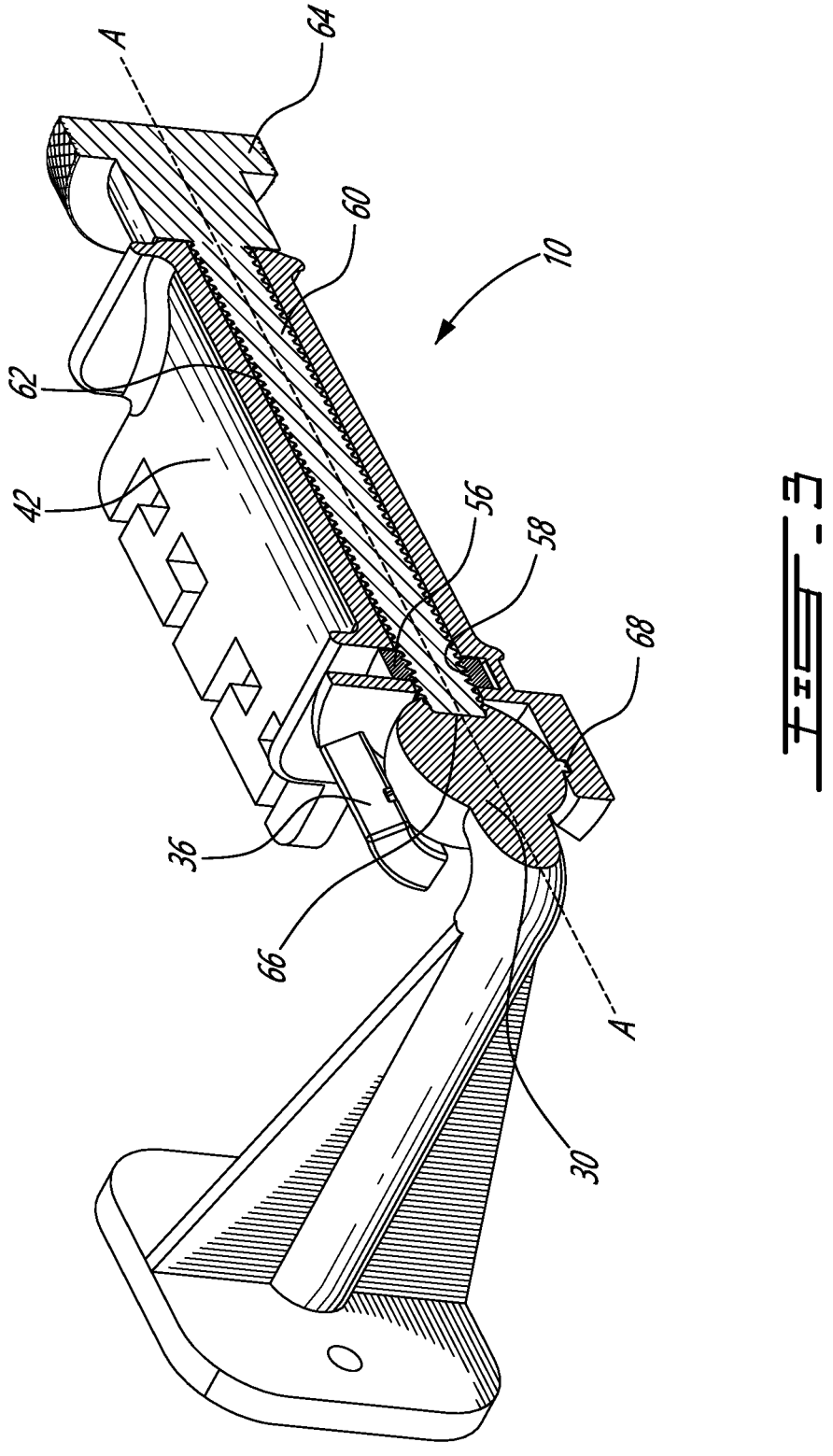
FIG. 3 provides a sectional view along III-Ill in FIG. 1.

Referring now to FIG. 3 in addition to FIGS. 1 and 2, in order to releasably secure the ball 30 and socket 36 in a fixed relationship a securing mechanism is provided comprising a bolt 56 embedded in the cable receiving part 40. The bolt 56 comprises a threaded inner surface 58 arranged concentric with the axis A-A which engages a threaded shaft 60. The shaft 60 is held for rotation within a shaft receiving bore 62 arranged concentric with the axis A-A and further comprises a user actuatable knob 64. As a person of skill in the art will now understand, depending on the direction the knob 64 is turned, an end 66 of the shaft 60 may be selectively moved towards or away from the ball 30 held within the socket 36. Moving the shaft 60 towards the ball 30 causes the end 66 to engage the ball 30 thereby releasably secures the ball 30 in a fixed relationship to the socket 36.

Referring to FIG. 4A in addition to FIGS. 2 and 3, releasing the engagement between the support 12 and the cable receiving part 40 by rotating the knob 64 allows the cable receiving part 40 to be rotated relative to the support 12. In this regard, the ball 30 comprises bosses 68 which engage with features 70 on the socket 36 in order to limit rotation of the cable receiving part 40 to the support 12 to within predetermined limits. In an intermediate position as shown in FIG. 4A a middle one of the bosses 68 is received within the lower feature 70. In this regard the lower feature 70 comprises bevelled walls 72 such that the boss 68 can be moved in to and out of the feature 70 while providing tactile feedback.

Referring to FIGS. 5A through 5C, illustratively the bosses 68 and features 70 are positioned such that the strain relief member 34 can be rotated through 50° and the cable receiving surfaces 42 positioned at up to ±25° from the horizontal. This allows cables 44 to be conveniently received and secured from above (FIG. 5A), below (FIG. 5B) and the side (FIG. 5C) as well as intermediate positions.

Although the present invention has been described hereinabove by way of specific embodiments thereof, it can be modified, without departing from the spirit and nature of the subject invention as defined in the appended claims.

The invention claimed is:

1. A strain relief assembly, comprising:
a support portion structurally configured to include a base portion, a first portion coupled with the base portion, and a second portion extending away from an end of the first portion;
a strain relief portion structurally configured to attach to a free end of the second portion for rotation about an axis;
a securing portion structurally configured to move relative to the strain relief portion between a secured position and a released position;
wherein the strain relief portion comprises a cable receiving portion arranged along the axis;
wherein the strain relief portion includes a threaded inner surface portion; and wherein the securing portion comprises a shaft;
wherein an end of the shaft extends beyond the strain relief portion and comprises an actuator attached to the end of the shaft and configured to rotate the shaft about the axis;
wherein a complementary threaded portion of the shaft is configured to engage the threaded inner surface portion such that rotation of the shaft moves a second shaft end along the axis between the secured position and the released position;
wherein the securing portion is structurally configured to disable rotation of the strain relief member about the axis in the secured position;
wherein the securing portion is structurally configured to enable rotation of the strain relief member about the axis in the released position; and
wherein the strain relief portion is structurally configured to rotate about the axis between a first angled orientation and a second angled orientation through a horizontal orientation so as to enhance management of fiber optic-cables in high-density applications.

2. The assembly of claim 1, wherein the strain relief portion is configured to provide mechanical feedback as the strain relief portion is rotated into the horizontal orientation.

3. The assembly of claim 1, wherein an angle between the first angled orientation and the second angled orientation is less than or equal to 50 degrees.

4. The assembly of claim 2, wherein the free end of the second portion includes a boss configured to engage the strain relief portion so as to provide mechanical feedback as the strain relief portion is rotated into the horizontal orientation.

5. The assembly of claim 1, wherein the strain relief portion further comprises a shaft receiving bore concentric with the axis and extending a length of the strain relief member, and wherein the securing portion comprises a shaft configured for travel within the shaft receiving bore between the secured position and the released position.

6. The assembly of claim 5, wherein a first shaft end of the shaft is configured to press against the free end of the second portion in the secured position so as to disable rotation of the strain relief portion about the axis, and wherein the shaft is configured to be positioned away from the free end of the second portion in the released portion such that rotation of the strain relief portion about the axis is enabled.

7. The assembly of claim 5, wherein the threaded inner surface portion comprises a nut comprising imbedded in the strain relief portion concentric with the axis.

8. A strain relief assembly, comprising:
a support portion comprising a base portion, a first portion attached to the base portion, and a second portion extending away from an end of the first portion;
a strain relief portion structurally configured to attach to a free end of the second portion for rotation about an axis;
a securing portion;
wherein the strain relief portion is attached to a free end of the support portion for rotation about the axis;
wherein the strain relief portion comprises a cable receiving portion arranged along the axis;
wherein the securing portion is configured to move between a secured position and a released position; and
wherein the strain relief portion includes a threaded inner surface portion, and wherein the securing portion comprises a shaft portion;
wherein an end of the shaft portion extends beyond the strain relief portion and comprises an actuating portion attached to the end of the shaft portion and configured to rotate the shaft portion about the axis;
wherein a complementary threaded portion of the shaft portion is configured to engage the threaded inner surface portion such that rotation of the shaft portion moves a second end of the shaft portion along the axis between the secured position and the released position; and
wherein the shaft is structurally configured to disable rotation of the strain relief portion about the axis in the secured position so as to enhance management of fiber optic-cables in high-density applications.

9. The assembly of claim 8, wherein the strain relief portion further comprises a shaft receiving portion concentric with the axis and extending a length of the strain relief portion, and wherein is configured to travel within the shaft receiving portion between the secured position and the released position.

10. The assembly of claim 8, wherein a first shaft end portion of the shaft portion is configured to press against the free end of the second portion in the secured position so as to disable rotation of the strain relief portion about the axis, and wherein the shaft portion is configured to be positioned away from the free end of the second portion in the released position such that rotation of the strain relief portion about the axis is enabled.

11. The assembly of claim 8, wherein the threaded inner surface portion comprises a nut imbedded in the strain relief portion concentric with the axis.

12. The assembly of claim 8, wherein the strain relief portion is configured to rotate between a first angled orientation and a second angled orientation through a horizontal orientation.

13. The assembly of claim 12, wherein an angle between the first angled orientation and the second angled orientation is less than or equal to 50 degrees.

14. A device configured to prevent a strain relief portion from rotating during operation comprising:

a strain relief portion that is configured to rotate about an axis, the strain relief portion comprising a cable receiving portion that extends along the axis;

a strain relief securing portion that is configured to prevent rotation of the strain relief portion about the axis during operation of the strain relief portion;

a support portion comprising a base portion, a first portion attached to the base portion, and a second portion extending away from an end of the first portion;

wherein the strain relief portion is attached to a free end of the second portion for rotation about the axis; and wherein the free end of the second portion comprises a ball, and the strain relief portion further comprises a socket concentric with the axis for receiving the ball.

15. The device of claim 14, wherein the second portion extends away from the first portion at a right angle to the first portion.

16. The device of claim 14, wherein the cable receiving portion comprises a first cable receiving surface portion.

17. The device of claim 16, wherein the cable receiving portion comprises a second cable receiving surface portion on an opposite side of the axis to the first cable receiving surface portion.

18. The device of claim 17, wherein the first cable receiving surface portion and the second cable receiving surface portion are matching surfaces and arranged opposite one another about the axis.

19. The device of claim 14, wherein the cable receiving portion further comprises a pair of outer edges arranged opposite one another on either side of and in parallel to the axis, wherein each of the outer edges comprises a cable securing portion along a length thereof.

* * * * *